(12) United States Patent
Kochanek et al.

(10) Patent No.: US 9,309,832 B2
(45) Date of Patent: Apr. 12, 2016

(54) ROCKET MOTOR WITH MEANS FOR USER ADJUSTABLE THRUST

(75) Inventors: Andrew M. Kochanek, Suffield, CT (US); Kurt Nelson, Simsbury, CT (US); Daniel P. Sutula, Jr., Harwinton, CT (US)

(73) Assignee: ENSIGN-BICKFORD AEROSPACE & DEFENSE COMPANY, Simsbury, CT (US)

( * ) Notice: Subject to any disclaimer, the term of this patent is extended or adjusted under 35 U.S.C. 154(b) by 877 days.

(21) Appl. No.: 13/537,829

(22) Filed: Jun. 29, 2012

(65) Prior Publication Data

US 2014/0007554 A1    Jan. 9, 2014

(51) Int. Cl.
  *F02K 9/30* (2006.01)
  *F02K 1/00* (2006.01)
  *F02K 9/80* (2006.01)
  *F02K 9/92* (2006.01)

(52) U.S. Cl.
  CPC ... *F02K 1/00* (2013.01); *F02K 9/30* (2013.01); *F02K 9/805* (2013.01); *F02K 9/92* (2013.01)

(58) Field of Classification Search
  CPC ............... F02K 9/32; F02K 9/30; F02K 9/00; F02K 9/97; F02K 9/80; F02K 9/84; F02K 9/88; F02K 9/90; F02K 9/92; F42B 10/663; F42B 10/665; F42B 15/00
  USPC .................. 60/233, 242, 253, 263, 770, 771, 60/39.464, 39.47; 239/265.11, 265.19, 239/265.25, 265.29
  See application file for complete search history.

(56) References Cited

U.S. PATENT DOCUMENTS

| | | | | |
|---|---|---|---|---|
| 3,145,531 | A * | 8/1964 | Deutsch | 60/202 |
| 3,177,655 | A * | 4/1965 | White | 60/254 |
| 3,302,890 | A * | 2/1967 | Silver | 239/265.31 |
| 3,313,113 | A * | 4/1967 | Maxson et al. | 60/254 |
| 3,383,861 | A * | 5/1968 | Bell, Jr. | 60/229 |
| 3,442,083 | A * | 5/1969 | Klotz | 60/229 |
| 6,494,035 | B1 * | 12/2002 | Garcia | F02K 9/18 102/290 |

* cited by examiner

*Primary Examiner* — Steven Sutherland
(74) *Attorney, Agent, or Firm* — Cantor Colburn LLP

(57) ABSTRACT

A rocket having a motor with a user adjustable thrust is provided. The rocket includes a main cylinder containing a rocket propellant, the propellant configured to generate gas during operation and one or more nozzles arranged to direct the gas in a first direction. A thrust adjustment device is arranged to receive a portion of the gas, the thrust adjustment device configured to change the direction of flow of at least a portion of the gas.

12 Claims, 13 Drawing Sheets

ROCKET MOTOR WITH MEANS FOR USER ADJUSTABLE THRUST

BACKGROUND OF THE INVENTION

The present invention relates in general to rocket motors and in particular to a rocket motor that can be used to tow a payload and has a user adjustable thrust Rocket motors are well known in the art and are most frequently used as a means of pushing a payload by expelling gas from a one or more nozzles located at the aft end of the rocket motor. However, some applications require that the payload be towed or pulled to their destination to accomplish the intended objective. For towing applications it is sometimes beneficial to configure the rocket motor such that the nozzles are located at the forward end of the rocket. The advantages of forward nozzle configurations may include improved dynamic stability, and reducing the possibility of the hot exhaust gases burning or damaging the attached payload. One such example, is the U.S. Army's anti-personnel obstacle breaching system (APOBS), which utilizes a rocket motor to tow an explosive line charge through the air in order to land on the ground over a target area. The target path or area is subsequently cleared or neutralized by detonating the explosive charge. Conventional rocket motors used in these applications typically feature a fixed propulsion capability, which would result in fixed or repeatable trajectory. If field conditions changed, such as requiring a shorter flight or a lower weight payload, the field operator has no means of adjusting the rocket motor output to accomplish the new objective.

Accordingly, while existing rocket motors are suitable for their intended purposes the need for improvement remains, particularly in providing a rocket motor that allows the adjustment of output thrust by field operators.

SUMMARY OF THE INVENTION

According to an embodiment of the invention, a rocket motor is provided. The rocket motor includes a propellant, the propellant configured to generate gas during operation. One or more nozzles are arranged to receive and direct the gas in a first direction. A thrust adjustment device is arranged to receive a portion of the gas, the thrust adjustment device configured to change the direction of flow of at least a portion of the gas.

According to an embodiment of the invention, another rocket motor is provided. The rocket motor includes a housing and a propellant arranged in the housing. The propellant being configured to generate gas during operation. One or more nozzles are arranged operably coupled to the housing and arranged to receive and direct the gas in a first direction. A thrust adjustment device is coupled to the housing and arranged to receive a portion of the gas, the thrust adjustment device configured to change a pressure of the gas within the housing during operation.

According to an embodiment of the invention, a method of operating a rocket motor having a propellant is provided. The method includes the step of moving a user selectable thrust adjustment device to a first position. The propellant is ignited. A gas is generated with the propellant. A first portion of the gas is directed in a first direction with the user selectable thrust adjustment device.

Advantages of embodiments of the present invention include the fact that various payloads can be selected and deployed based on the specific combat or tactical objective encountered in a dynamic battlefield situation.

BRIEF DESCRIPTION OF THE DRAWINGS

The various embodiments of the present invention can be understood with reference to the following drawings. The components are not necessarily to scale. Also, in the drawings, like reference numerals designate corresponding parts throughout the several views.

DETAILED DESCRIPTION OF THE INVENTION

Figure 1:
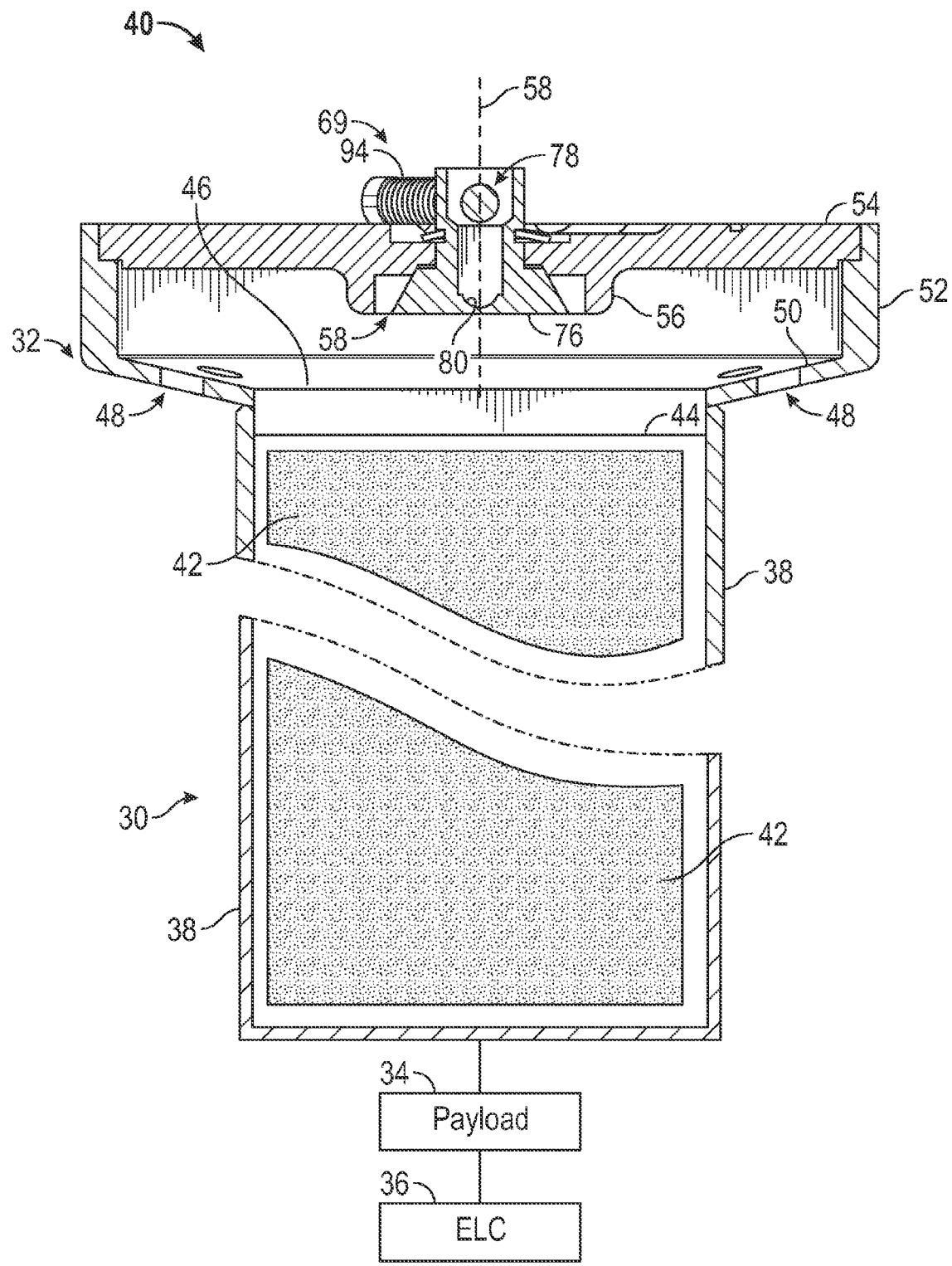
FIG. 1 is a sectional view of a rocket device in accordance with an embodiment of the invention.

A rocket device 30, such as the one shown in FIG. 1, is a common device used by military personnel during operations. The rocket 30 is comprised of a rocket motor 32 and a payload 34. In one embodiment, the payload may be an explosive line charge 36 coupled to the end of the rocket 30 opposite the motor 32. The payload 34 may be a suitable ordnance or multiple modular ordnance kits selectable by the user, such as fragmentary grenades for example, that are towed or carried over the desired target location by the motor 30. Once in position, the ordnance is detonated, clearing a suitable pathway free from obstructions such as mines or barbed wire for example. It should be appreciated that while embodiments herein describe the rocket device 30 as carrying ordnance, the claimed invention should not be so limited and the rocket device 30 may be used for other uses, such as but not limited to carrying a rope across an open space (e.g. a ravine) for example.

The rocket 30 includes a casing or housing having a main cylinder 38 with a chamber portion 40 disposed on one end. The chamber portion 40 generally has a larger diameter than the main cylinder 38. Within the main cylinder 38 is a solid rocket propellant 42.

When ignited, the rocket propellant burns, generating a high temperature, high pressure, gas. In some embodiments, the rocket motor 32 may incorporate the use of a burst disk 44 disposed between the rocket propellant 42 and a chamber 46. The chamber 46 includes a plurality of openings 48 formed in a wall 50 that extends between the main cylinder 38 and an outer diameter wall 52. In the exemplary embodiment, the wall 50 has a conical shape. The openings 48 are formed to allow the gas to escape the chamber 46 and create forward thrust. The gas is generally directed in a direction opposite the direction of travel. In the exemplary embodiment, the openings 48 are angled to direct the gas substantially along and slightly outward from the main cylinder 38. In one embodiment, the chamber 46 includes two sets of openings 48 arranged on opposite sides of the chamber 46.

Figure 2:
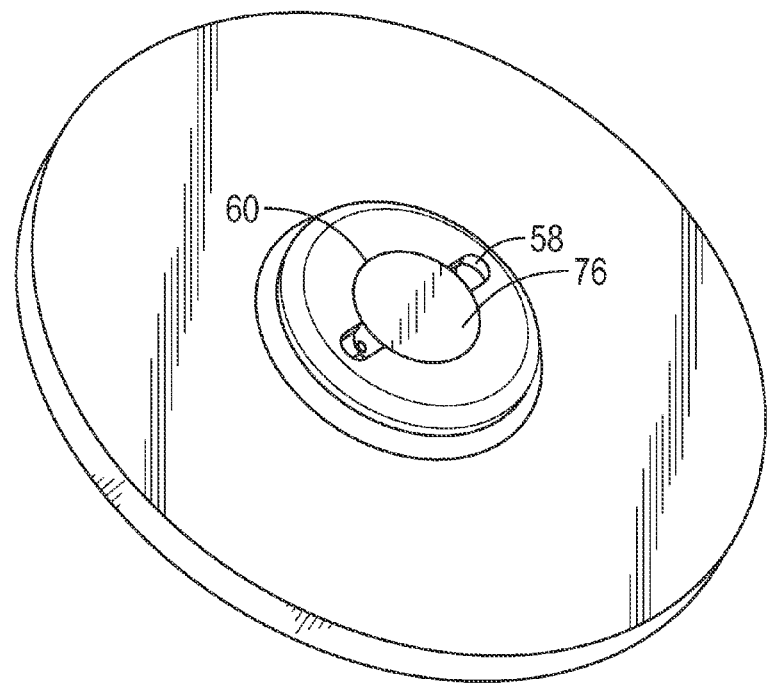
FIG. 2 is a perspective view of a thrust adjustment device for the rocket device of FIG. 1.
Figure 3:
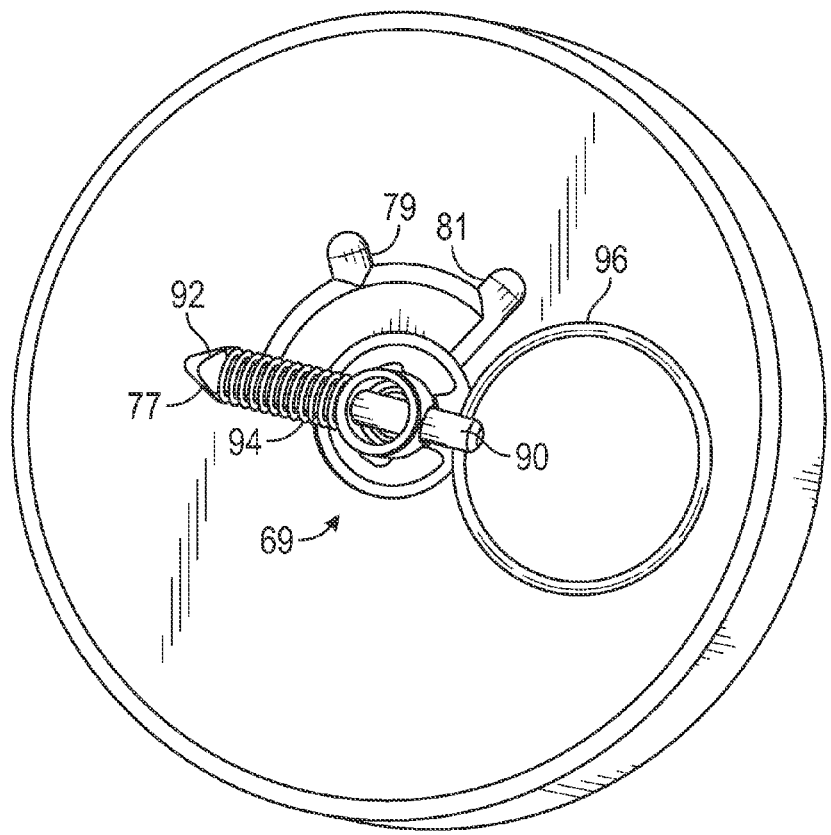
FIG. 3 is a reverse perspective view of the thrust adjustment device of FIG. 2.
Figure 4:
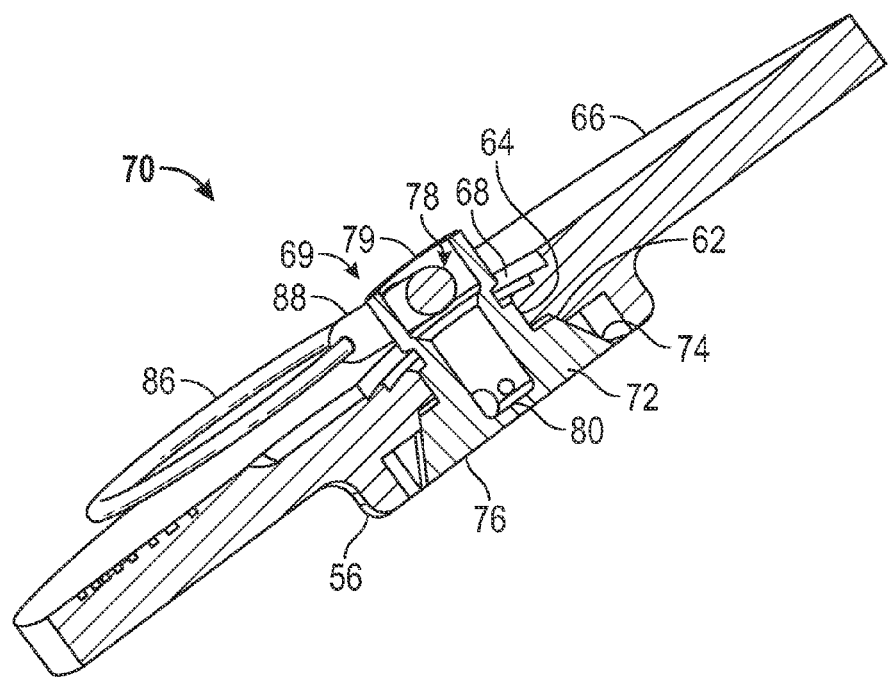
FIG. 4 is a perspective view, partially in section, of the thrust adjustment device of FIG. 2.

Arranged opposite the optional burst disk 44 is an end wall 54 that encloses the end of the chamber 46. The end wall 54 may be a separate component coupled to the wall 52, such as by welding for example, or may be integrally formed in the chamber portion 40. The end wall 54 includes a projection 56 that extends into the chamber 46 and is arranged coaxial with the longitudinal axis or centerline 58 of the motor 32. A first opening 60 (FIG. 2) having a conical surface 62 (FIG. 4) is formed in the projection 56. A slot 58 is formed across the first opening 60 in the projection 56. A second cylindrical opening 64 extends from the first opening 60 through the exterior surface 66. In one embodiment, a recess or counter bore 68 is formed in the exterior surface 66. The exterior surface 66 may include one or more recesses 77, 79, 81. As will be discussed in more detail below, the recesses 77, 79, 81 are sized to receive a plunger from a selector mechanism that allows for a user to adjust the output thrust of the motor 32 in the field.

Figure 5:
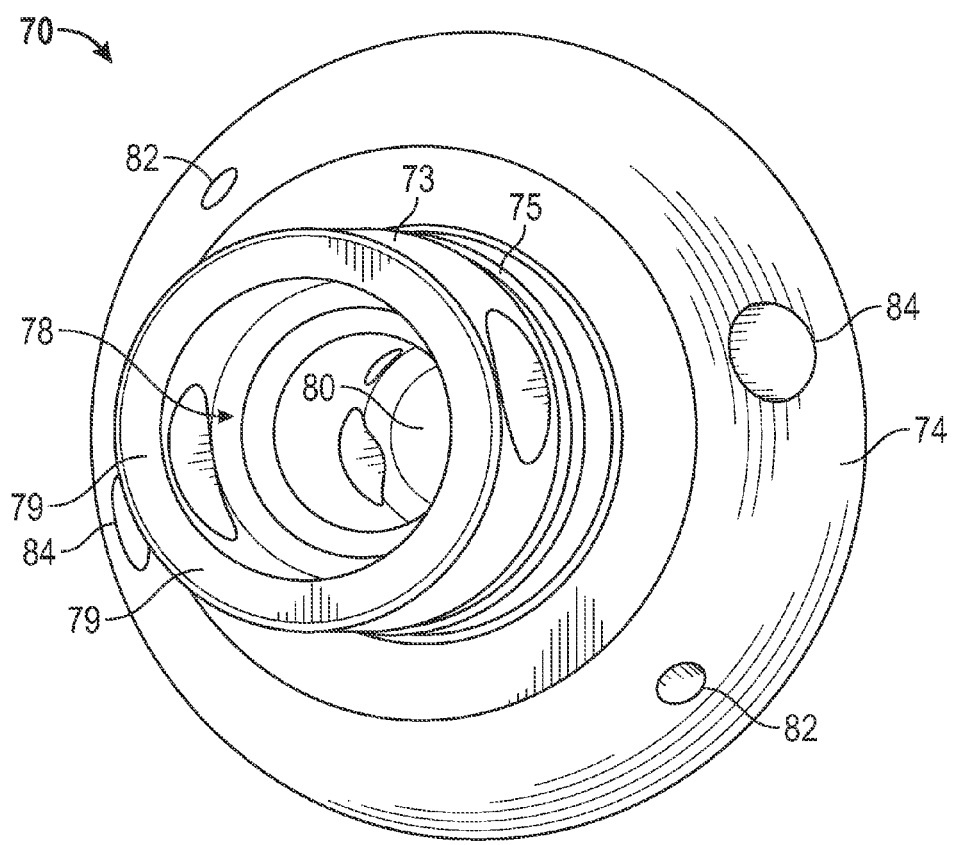
FIG. 5 is a perspective view of a valve for use with the thrust adjustment device of FIG. 2.

The first opening 60 and the second opening 64 are sized to receive a thrust adjustment device 69 having a valve body 70 (FIG. 5). The valve body 70 includes a first portion 72 having a bottom surface 76 and a conical outer surface 74. The conical surface 74 is sized and shaped to fit within the opening 60 and in the exemplary embodiment bottom surface 76 is substantially flush with the surface of projection 56. The conical surface 74 provides advantages in allowing the valve body 70 to self seal under the pressure loading from the gas in chamber 46. A second portion 73 extends from the first portion 72 and is sized to extend through the wall 64. The second portion 73 may include a slot 75 that is sized to receive a retention device, such as a snap ring for example, that couples the valve body 70 to the wall 54. In the exemplary embodiment, the valve body 70 is arranged co-axial with the centerline 58.

The valve body 70 further includes a bore 78 having an open end 79 that extends through the second portion 73 and into the first portion 74 and has a bottom surface 80. The bottom surface 80 is arranged adjacent from the surface 76. A first pair of openings 82 and a second pair of openings 84 extend between the bore 78 and the conical surface 74. The openings with the pairs are arranged 180 degrees apart. The second pair of openings 84 is angularly offset from the first pair of openings 82. In the exemplary embodiment, the openings 82, 84 each have a different diameter. In one embodiment the openings 82 have a 0.125 inch (3.175 millimeters) diameter and the openings 84 have a 0.185 inch (4.699 millimeter) diameter. The openings 82, 84 are positioned to selectively engage the slot 58 when the valve body 70 is rotated to a predetermined orientation. As will be discussed in more detail below, when one of the openings 82, 84 is positioned within the slot 58, a fluid path is formed from the chamber 46 to the external environment.

The thrust adjustment device 69 further includes a selector mechanism 86. The selector 86 includes a plunger 88 having a body 90 and a head portion 92. The body 90 extends through the valve body second portion 73 and across the opening 78. A biasing member, such as a compression spring 94 is disposed between the head portion 92 and the valve body second portion 73. The spring 94 is arranged to bias the head towards and into one of the recesses 77, 79, 81. In the exemplary embodiment, when the head portion 92 is arranged in the second recess 79, the opening 82 is positioned within the slot 58. When the head portion 92 is arranged in the third recess 81, the opening 84 is positioned within the slot 58. The selector may further include a ring 96 coupled to the body 90 opposite the head portion 92. The ring 96 may facilitate the movement of the plunger 88 to compress the spring 94 and allow the rotation of the valve body 70.

In operation, it may be desirable to allow the field operator to adjust the amount of forward thrust developed by the motor 32. The ability to adjust the thrust would increase the flexibility and effective utility of the rocket 30 by allowing the same rocket 30 to be used in multiple scenarios. For example, if the field operator desired to send a lighter payload than normal, to reduce collateral damage for example, then the thrust may be reduced to accommodate the lighter weight.

Further, in other embodiments the thrust adjustment device 69 may be removably coupled to the end wall 54. In this embodiment, the thrust adjustment device 69 may have a fixed opening to bleed thrust. In the field, the operator would have multiple interchangeable fixed valves each providing a different amount of thrust bleeding to accommodate the desired payload, travel distance or trajectory. In still further embodiments, two thrust adjustment devices 69 may be coupled to the end wall 54 which are movable between a fully open and a fully closed position. This embodiment may be used to achieve three different trajectories (both valves closes, one valve open, both valves open).

Figure 6:
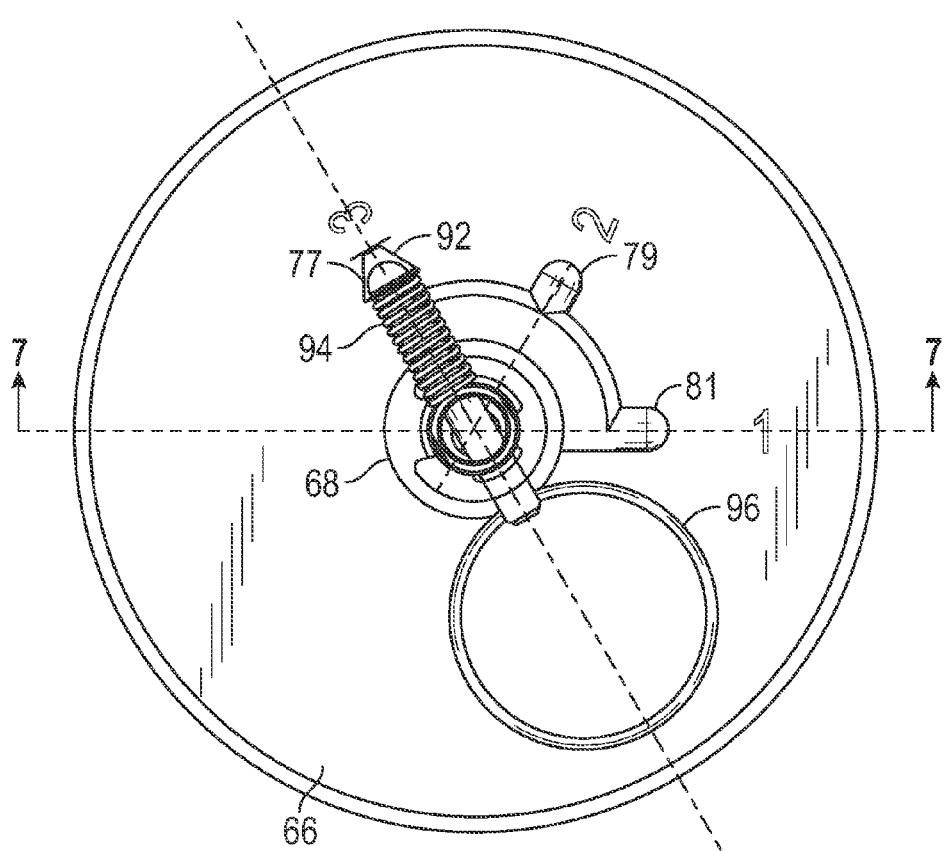
FIG. 6 is a top view of the thrust adjustment device of FIG. 2 in a first mode of operation.
Figure 7:
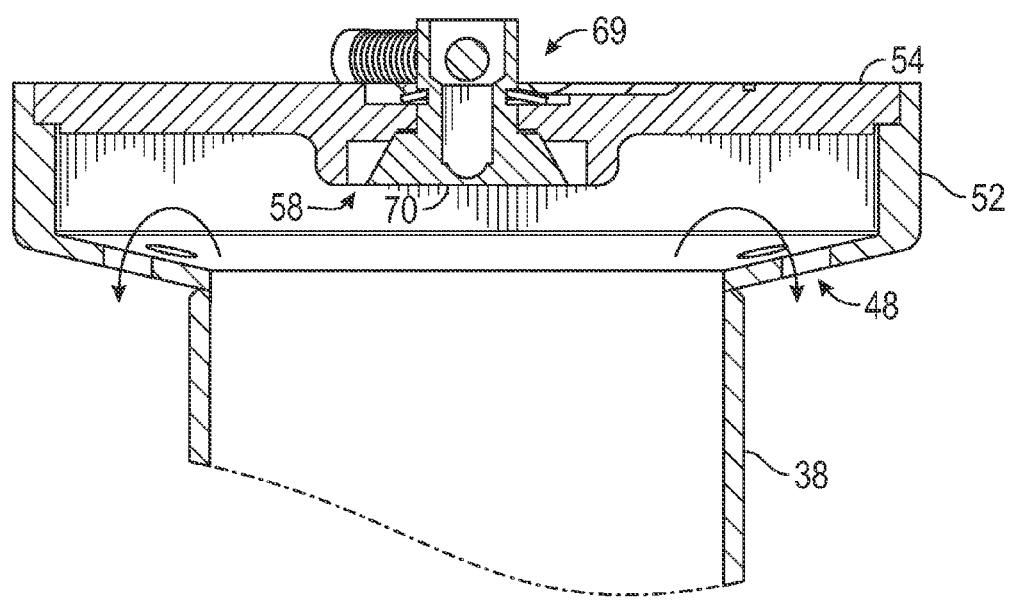
FIG. 7 is a side sectional view of the thrust adjustment device of FIG. 2 in the first mode of operation.

Referring now to FIGS. 6-11, the operation of the rocket 30 is shown for different forward thrust modes of operation. In FIG. 6 and FIG. 7, the selector 86 is positioned with the head portion 92 arranged in recess 77. In this embodiment, the valve body 70 is positioned such that neither of the holes 82, 84 are positioned within the slot 58. As a result, all of the gas generated by propellant 42 is directed through the openings 48 to produce the largest amount of forward thrust for a given propellant. This could be used, for example, for carrying a larger payload or for propelling a lighter payload a further distance.

Figure 8:
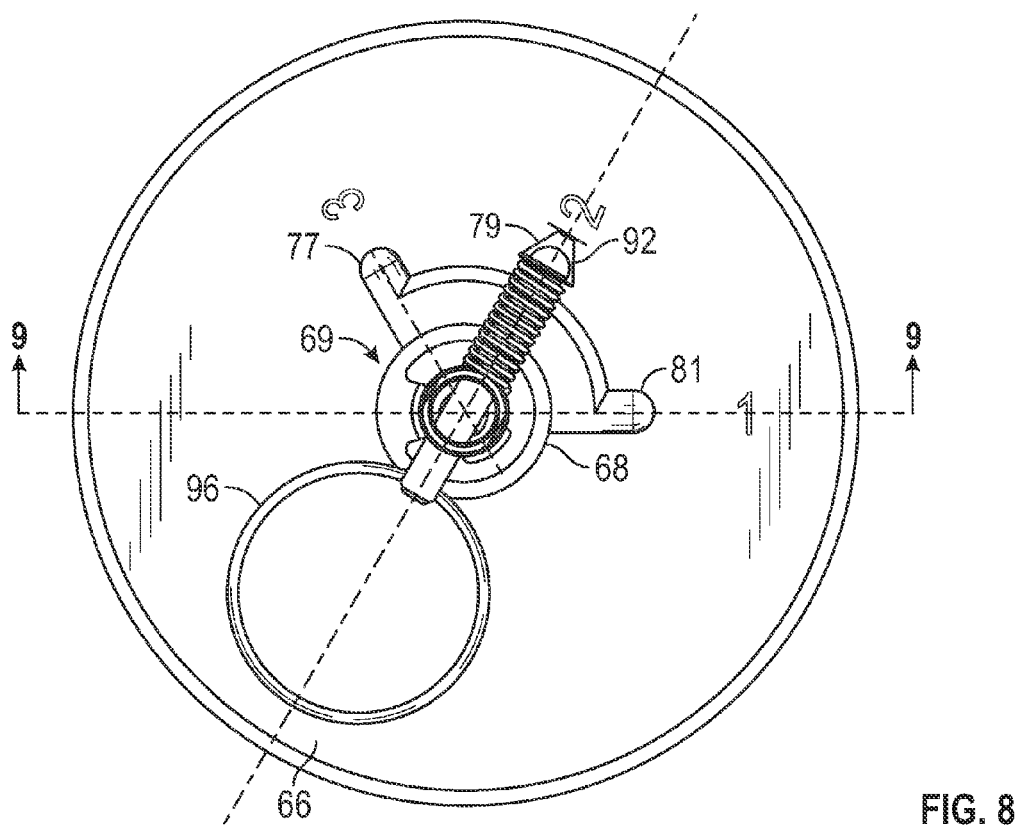
FIG. 8 is a top view of the thrust adjustment device of FIG. 2 in a second mode of operation.
Figure 9:
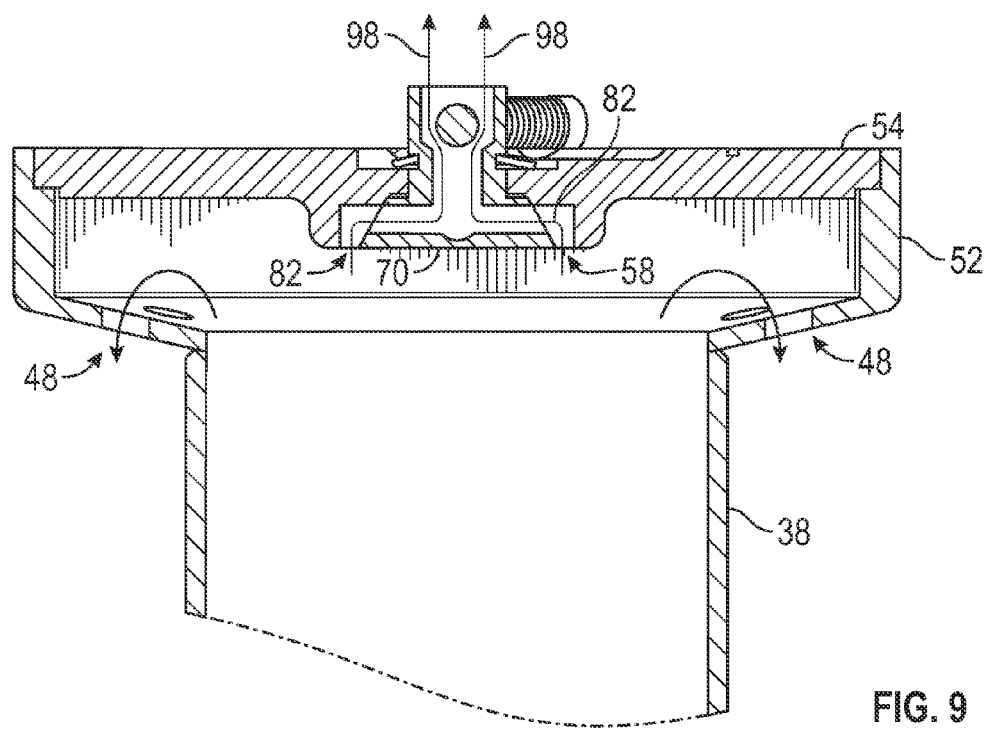
FIG. 9 is a side sectional view of the thrust adjustment device of FIG. 2 in the second mode of operation.

An intermediate thrust mode of operation is shown in FIG. 8 and FIG. 9. In this embodiment, the selector 86 is positioned with the head portion 92 arranged in recess 79. When in this position, the openings 82 are arranged within the slot 58 creating a first fluid path 98. The first fluid path 98 allows a first portion of the gas from the propellant 42 to travel from the chamber 46 through the slot 58, into the opening 82 and through the bore 78 to the external environment. It should be appreciated that the directing of the propellant through the first fluid path reduces the pressure within the chamber. In some embodiments, the reduction of the internal pressure also changes the burn rate of the propellant 42. The remaining second portion of the gas exits via the openings 48 to create forward thrust. It should be appreciated that this configuration reduces the pressure and thrust of the gas through the openings 48. Further, since the gas exiting via the first fluid path 98 is in the direction of travel, a counter thrust is generated that further assists in reducing the net thrust thereby reducing the payload capacity and/or the trajectory or distance travelled by the rocket 30.

Figure 10:
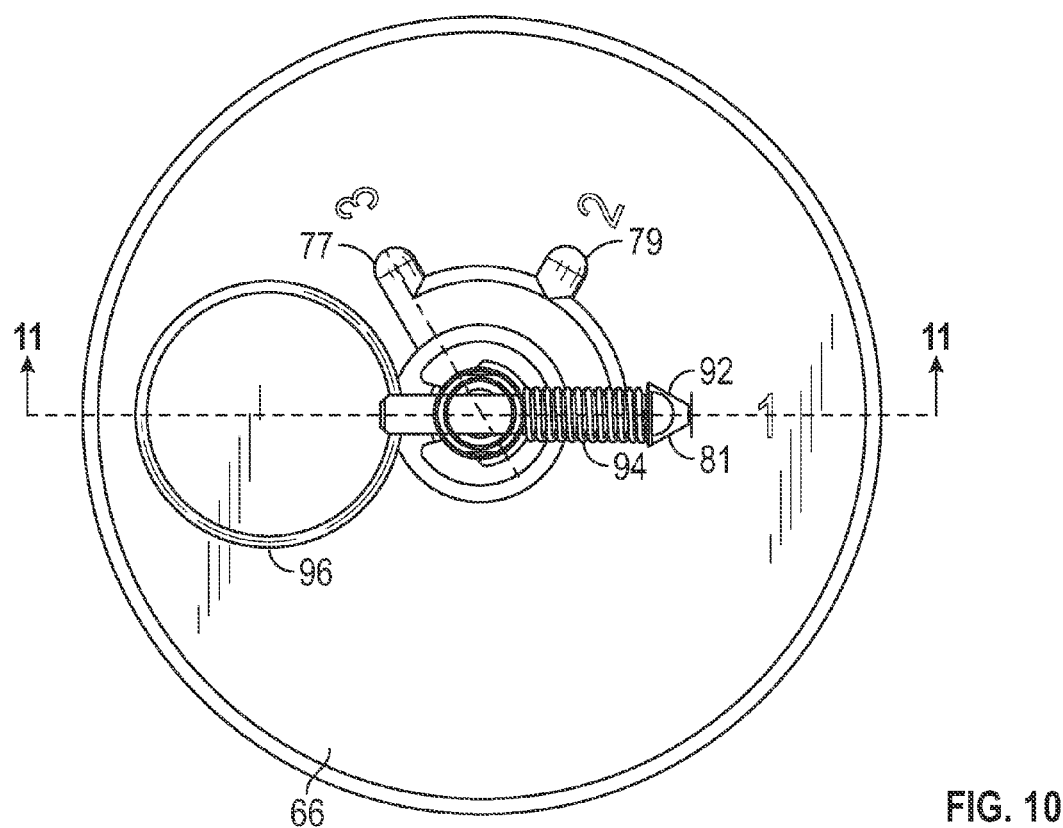
FIG. 10 is a top view of the thrust adjustment device of FIG. 2 in a third mode of operation.
Figure 11:
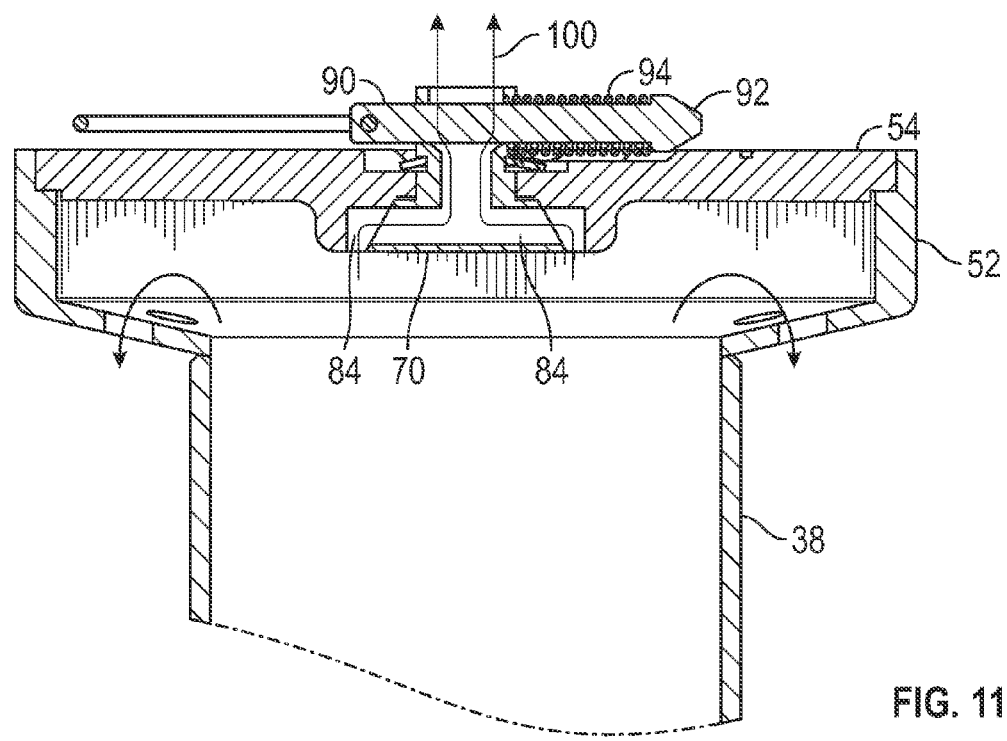
FIG. 11 is a side sectional view of the thrust adjustment device of Figure in the third mode of operation.

A reduced thrust mode of operation is shown in FIGS. 10 and 11. In this embodiment, the selector 86 is positioned with the head portion 92 arranged in recess 81. When in this position, the openings 84 are arranged within the slot 58 creating a second fluid path 100. The second fluid path 100 allows a third portion of gas from propellant 42 to travel from the chamber to the external environment via slot 58, opening 84 and bore 78. The remaining fourth portion of the gas exits via the openings 48 to create forward thrust. It should be appreciated that since the openings 84 are larger than the openings 82 the amount gas in the third portion is larger than the second portion. It should further be appreciated that the counter thrust generated by the third portion will be similarly larger than that generated by the first portion. As a result, the net forward thrust of the reduced thrust mode is smaller than the intermediate thrust mode.

It should be appreciated that while the embodiment shown in FIG. 1-11 illustrates the thrust adjustment device 69 having discrete points for thrust adjustment, the claimed invention should not be so limited. In other embodiments, the valve body 70 includes a continuously variable width slot instead of the openings 82, 84. The selector 86 may then be stopped using a suitable fixation mechanism at any point. As a result, a continuous user selectable adjustment of the forward thrust may be achieved.

Figure 12:
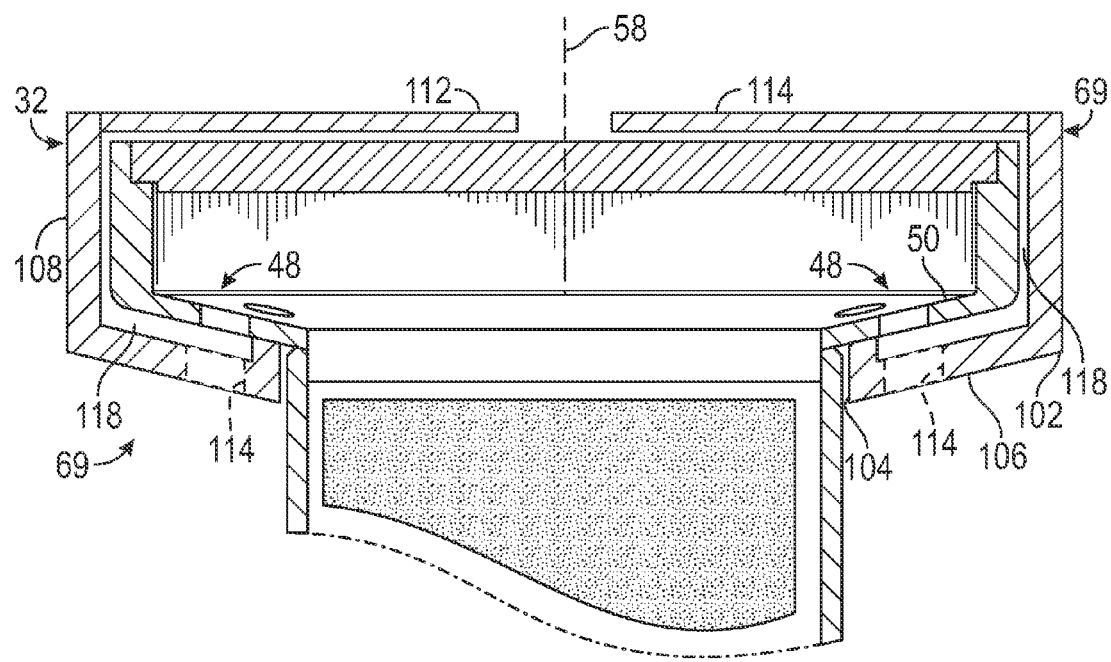
FIG. 12 is a side sectional view of a thrust adjustment device in accordance with another embodiment of the invention.
Figure 13:
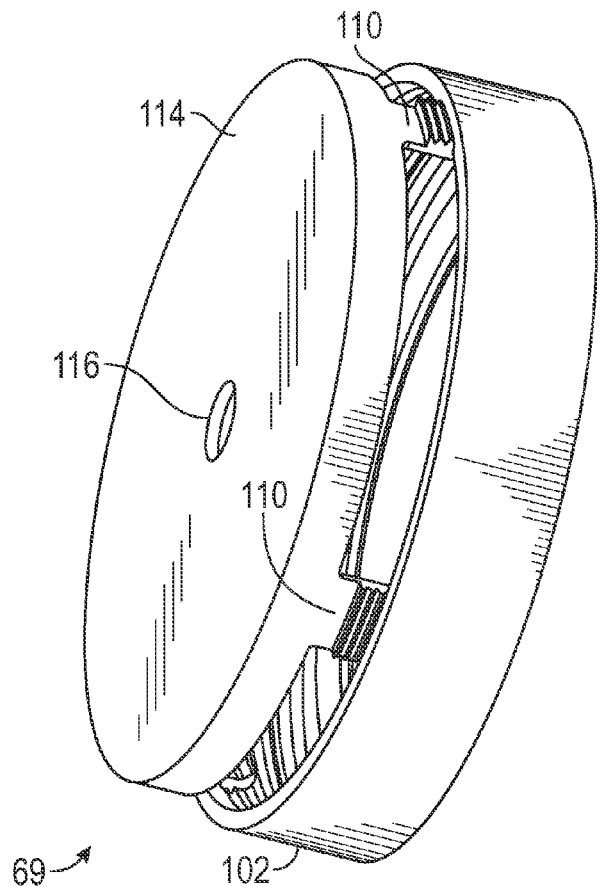
FIG. 13 is a perspective view of the thrust adjustment device of FIG. 12.
Figure 14:
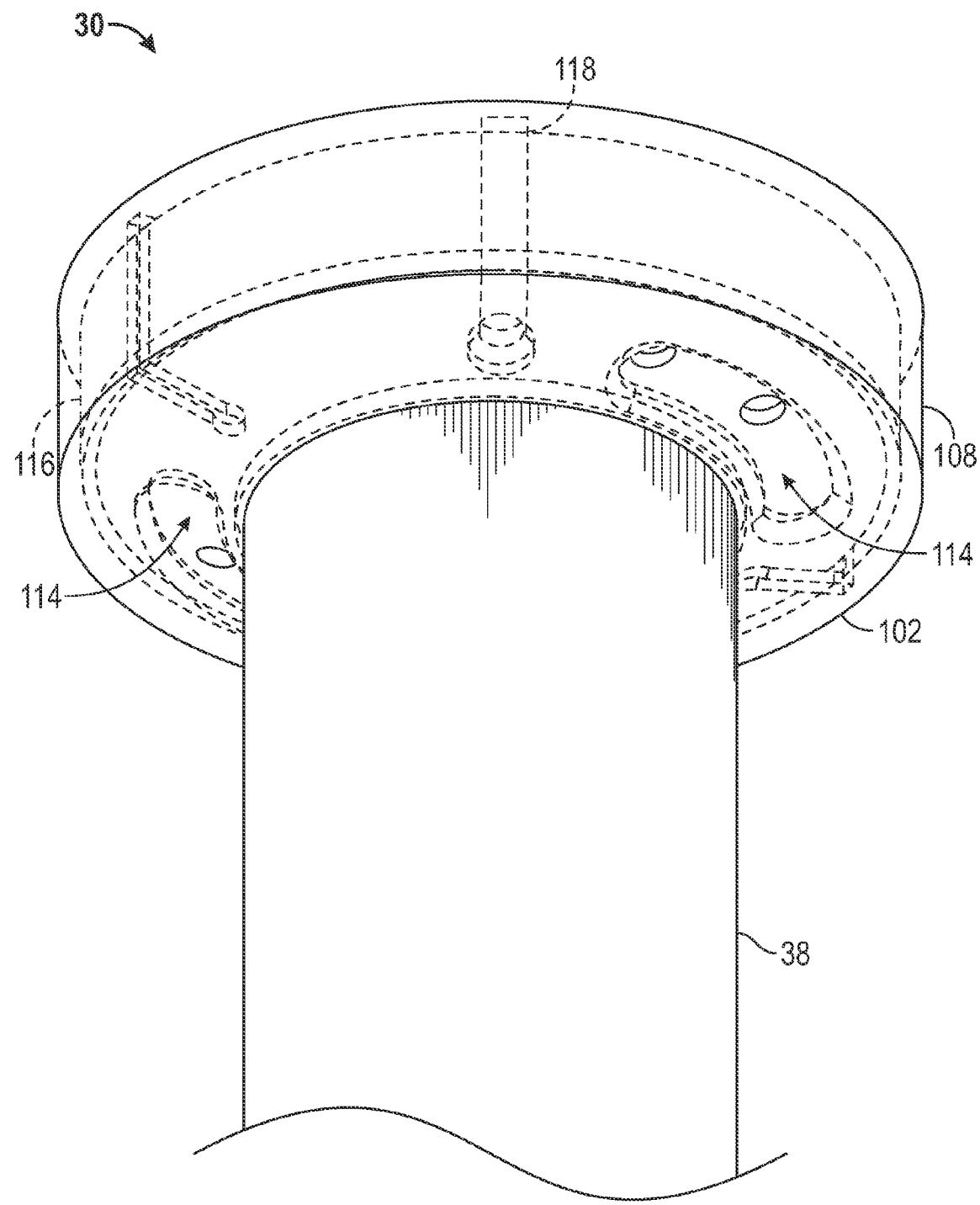
FIG. 14 is a perspective view of a rocket device having the thrust adjustment device of FIG. 12.

Referring now to FIGS. 12-14, another embodiment is shown of the thrust adjustment device 69. In this embodiment, the thrust adjustment device 69 includes an annular housing 102 having an inner diameter 104 disposed about the main cylinder 38. The housing 102 includes a first lower wall 106 and an outer diameter wall 108. In the exemplary embodiment, the lower wall 106 is conically shaped to match the wall 50. The outer diameter wall 108 has an inner diameter that is larger than the diameter of wall 52 to define a gap large enough to receive an arm 110 on a retaining member 112.

The housing 102 further includes a pair of slots 114. Adjacent the pair of slots 114 is a first duct 116 and a second duct 118. The ducts 116, 118 are sized and arranged to selectively fluidly couple with one of the openings 48. Each duct 116, 118 includes a fluid path that extends between the wall 106 and the wall 50 and then between the wall 108 and the wall 52. The end of each duct 116, 118 is open to the atmosphere at an opening in the exterior surface 66. The ducts 116 have a smaller cross sectional area than the ducts 118. As will be discussed in more detail, the slots 114 and ducts 116, 118 are arranged to be rotated between three positions. In a first position, the slots 114 encompass all of the openings 48 such that substantially all of the gas from chamber 46 is directed as forward thrust. In a second position, each of the ducts 116 engages one of the openings 48 to direct gas from the opening 48 through the duct and into the atmosphere through the exterior surface 66. Further, in a third position, each of the ducts 118 engage one of the openings 48 to direct gas from the opening 48 through the duct and into the atmosphere adjacent the exterior surface 66.

The retaining member 112 includes a generally planar top surface 114. An opening 116 is arranged in the top surface. The ducts 116, 118 each extend radially towards and have a terminal end at the opening 116 such that the opening 116 is in fluid communication with the openings 48 in the second and third positions. In the exemplary embodiment, the opening 116 is arranged coaxially with the centerline 58 of the motor 32. An outer wall 118 extends peripherally about the top surface 114. A plurality of arms 110 extend from the outer wall 118. The end of each arm 110 includes a threaded portion that is sized to engage a corresponding threaded portion of the outer wall 108 of the housing 102. When assembled, the outer wall of the retaining member overlaps the wall 108 of housing 102. It should be appreciated that when the housing 102 is coupled to the retaining member 112 by the threaded portions, the housing 102 may be rotatable either continuously, or between any number of discrete positions.

The embodiment of FIGS. 12-14 provides advantages allowing the thrust adjustment device 69 to be removably coupled or permanently affixed to the motor 32. This embodiment provides still further advantages since existing motors 32 may be retrofitted with the thrust adjustment device 69.

Figure 15:
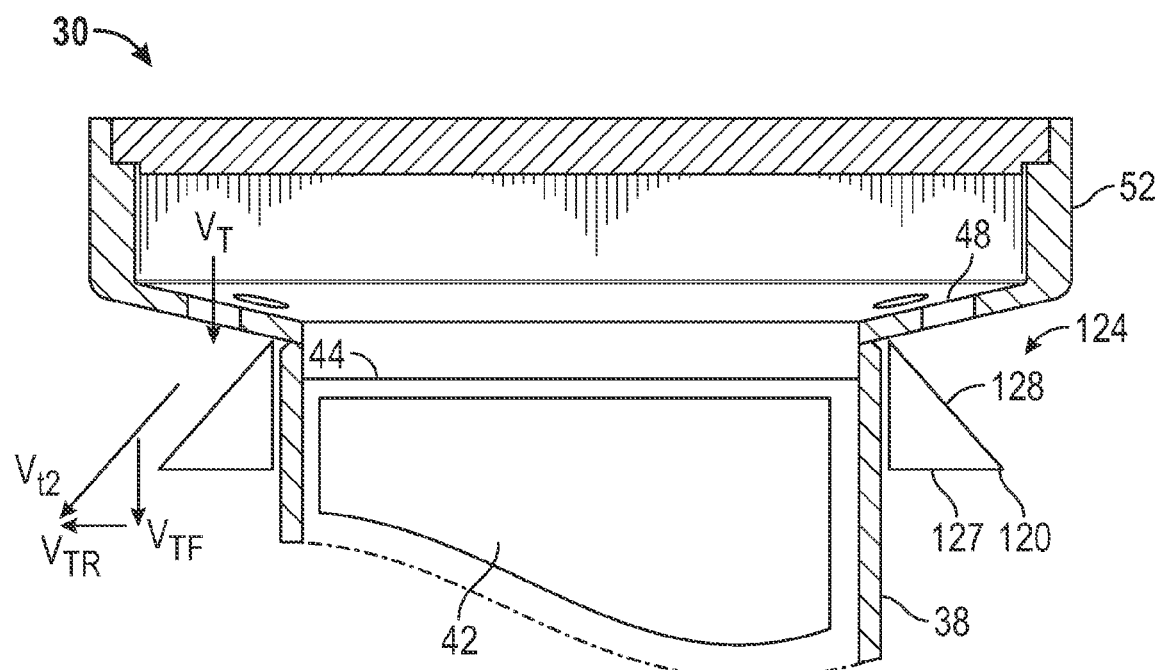
FIG. 15 is a side sectional view of a rocket device having a thrust adjustment device in accordance with another embodiment of the invention.
Figure 16:
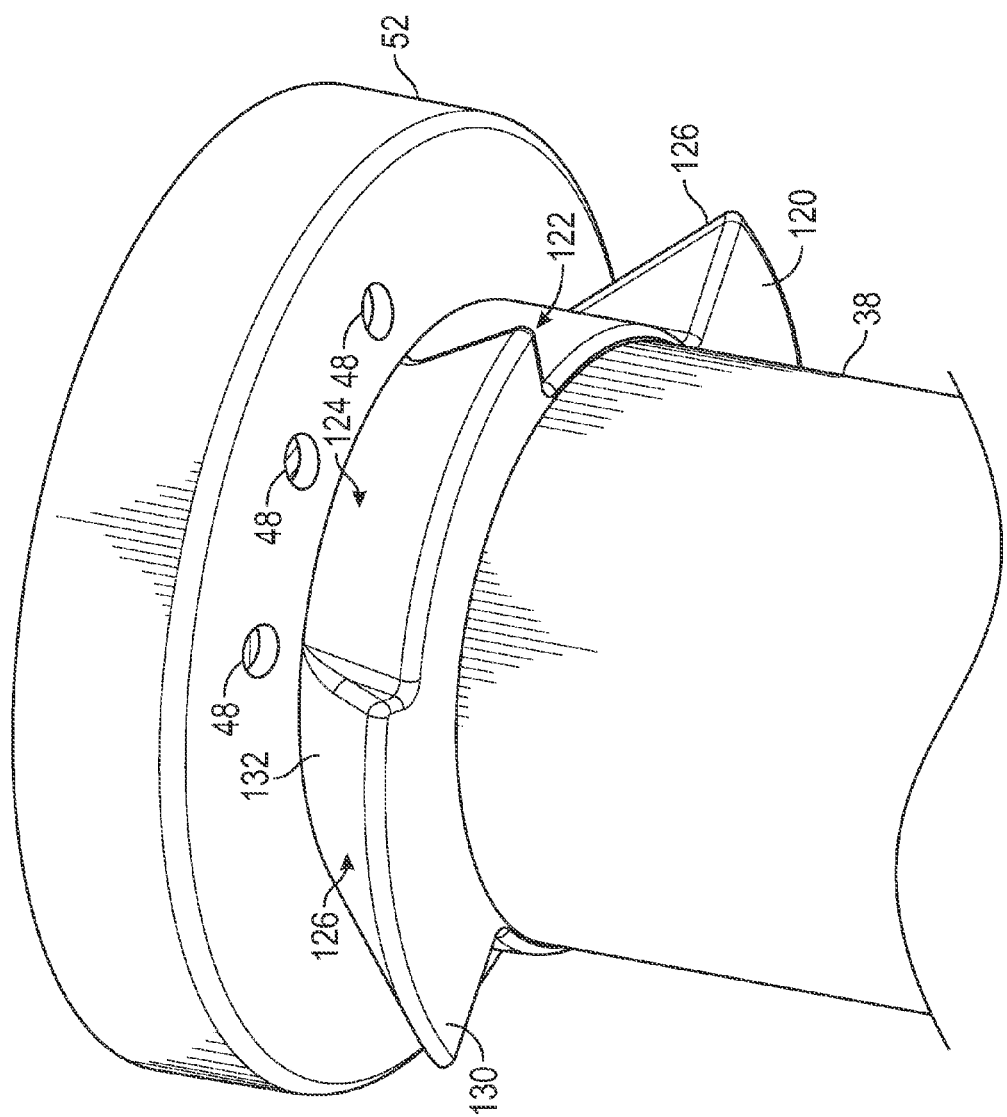
FIG. 16 is a perspective view of the rocket device of FIG. 15 with the thrust adjustment device in a first mode of operation.
Figure 17:
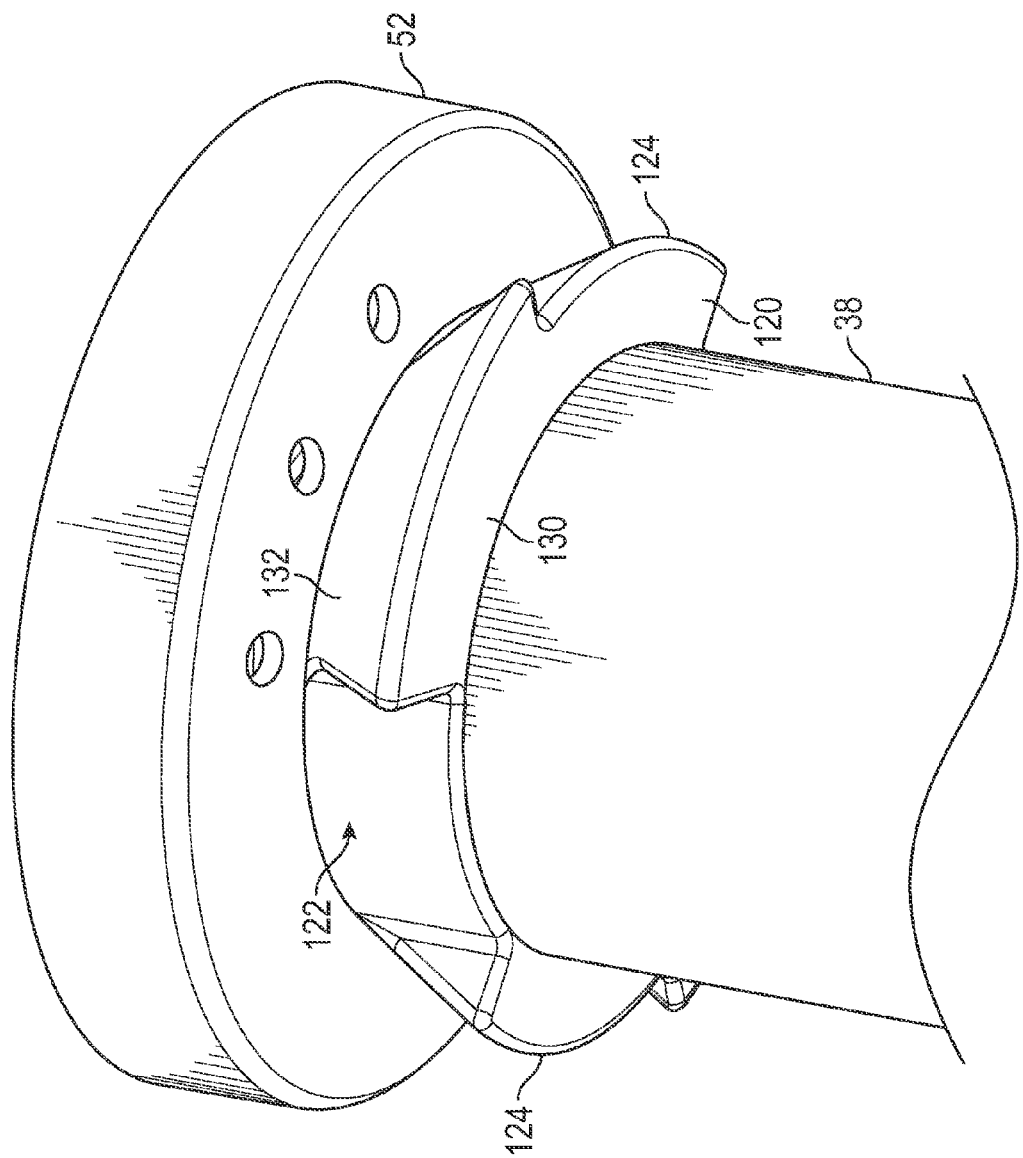
FIG. 17 is another perspective view of the rocket device of FIG. 15 with the thrust adjustment device in a second mode of operation.
Figure 18:
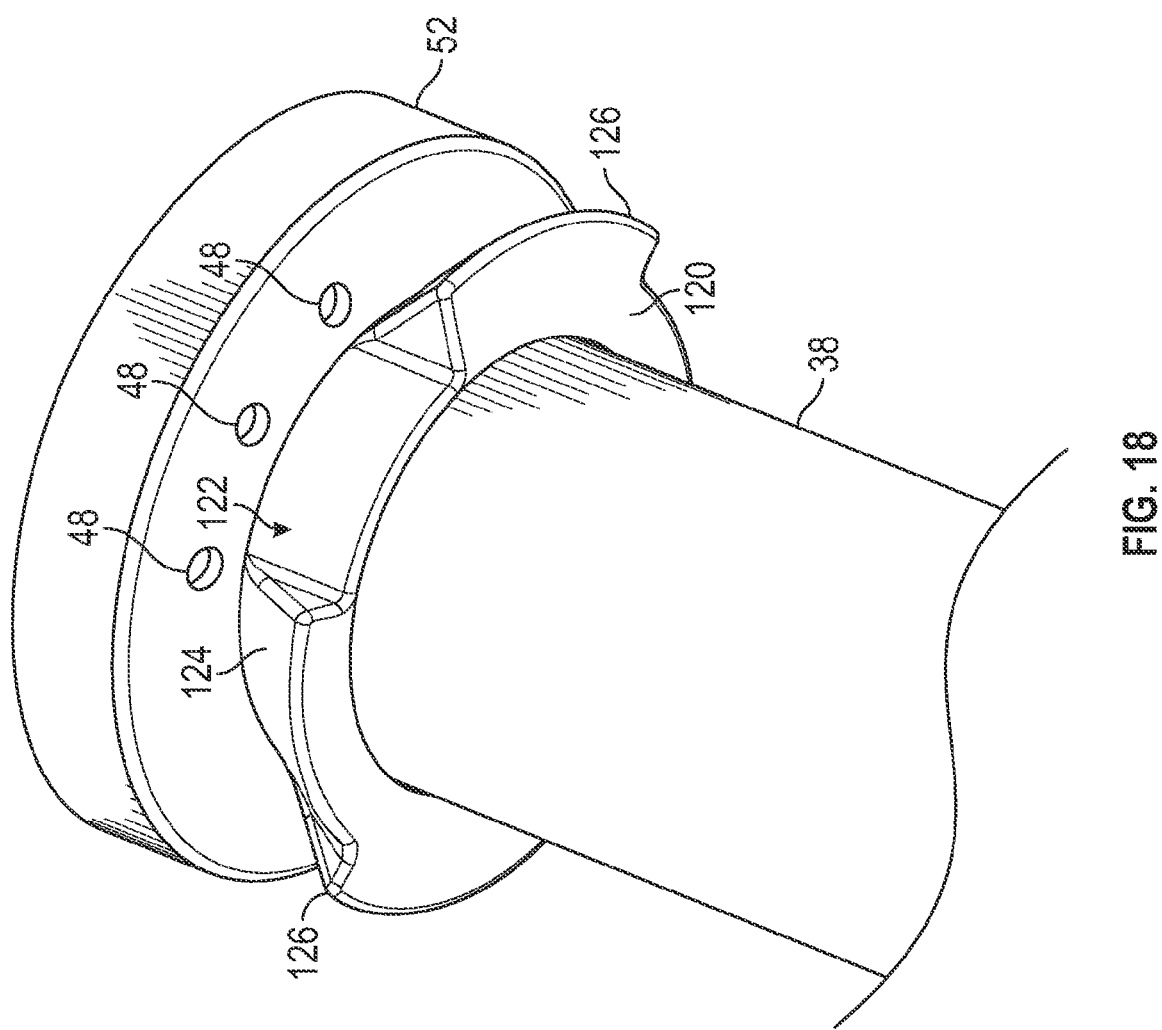
FIG. 18 is another perspective view of the rocket device of FIG. 16 with the thrust adjustment device in a third mode of operation; and, FIG. 19 is a perspective view of the thrust adjustment device of FIG. 15.
Figure 19:
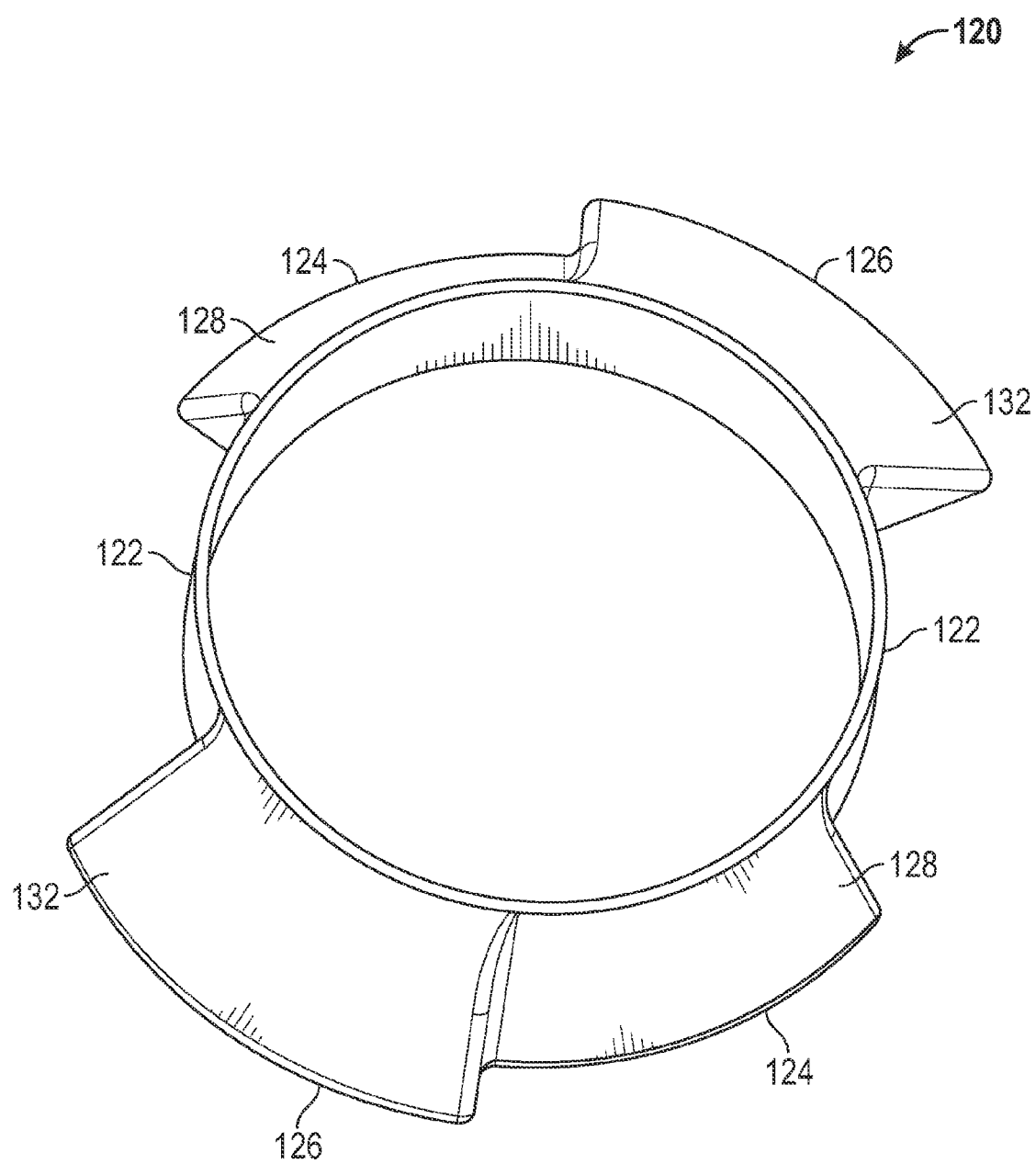

Referring now to FIGS. 15-17, another embodiment is of the thrust adjustment device 69. In this embodiment, the thrust adjustment device 69, includes a diverter member 120. The diverter member 120 includes a plurality of thrust segments 122, 124, 126. The diverter member 120 is rotationally coupled to the main cylinder 38 such that the field operator may rotate the diverter member 120 to position one of the thrust segments 122, 124, 126 adjacent to the openings 48 such that the thrust segment is in the flow path of the thrust gas. Alternately, the diverter member 120 may be variably coupled to the rocket motor by means of an axial translation along the axis. In other embodiments, the diverter member may be variably coupled to the rocket motor by means of angular adjustments, or by combinations of rotary, axial and/or angular adjustment.

The first thrust segment 122 has a straight cylindrical shape. When in this position, the segment 122 provides little or no impact on the direction of the gas exiting the openings 48. As a result, when the diverter member 120 is in the first position, the motor 32 will develop the largest amount of forward thrust.

The second segment 124 includes a projection 127 having a conical surface 128. When in this second position, the surface 128 is directly below the openings 48 and thus in the path of the gas. Since the surface 128 is angled, the direction $V_T$ of the thrust will be diverted radially outward to a new direction $V_{T2}$. It should be appreciated that since the new thrust direction $V_{T2}$ will have both a forward thrust component $V_{TF}$ and a radial thrust component $V_{TR}$ the net forward thrust will be less than when the diverter member 120 is in the first position with segment 122 adjacent the openings 48. Thus, when the diverter member 120 is in this second position, the rocket 30 will travel a shorter distance or lighter load than in the first position.

The third segment 126 similarly includes a projection 130 having a conical surface 132. In this embodiment, the angle between the centerline 58 and the conical surface 132 is greater than the angle of the conical surface 128. When the diverter member 120 is in the third position with the third segment 126 adjacent the openings 48, the surface 132 interrupts the flow of gas from the openings 48. This interruption diverts the gas radially outward from the original trajectory. Since the angle of surface 132 is larger than the angle of surface 128, the radial component $V_{TR}$ of the thrust vector $V_{T2}$ will be larger in the third position than the second position.

Thus, when the diverter member 120 is in the third position, the rocket 30 will generate less forward thrust than when in the second position.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

In embodiments of the present invention, a rocket is provided that includes a means for adjusting the net forward thrust of a rocket motor. In one embodiment, the thrust adjustment device includes a valve that diverts a portion of the generated gas through the top of the rocket, thereby decreasing the overall operating pressure of the rocket while simultaneously creating a counter-thrust. In another embodiment, the thrust adjustment device ducts some of the gas from the primary nozzles, and around the periphery of the chamber portion of the rocket to reduce the amount of forward thrust gas and to create a counter thrust. In still another embodiment, the thrust adjustment device diverts the forward thrust radially to reduce the net forward thrust Rockets having a motor with a thrust adjustment device provide advantages in accommodating different payload weights and or different trajectories. Rockets having a motor with a thrust adjustment device provide still further advantages for changing the distance travelled for a given payload. These advantages allow the operator to carry a single rocket motor that may be usable in a number of tactical situations by adjusting the amount of ordnance carried by the motor or the distance that the ordnance travels to provide a high degree of flexibility.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A rocket motor comprising:
a propellant, the propellant configured to generate gas during operation;
a chamber arranged on a front end of the rocket motor, the chamber positioned to receive the gas;
one or more nozzles fluidly coupled to the chamber and positioned on an opposite side of the chamber from the front end, the one or more nozzles being arranged to receive and direct the gas in a first direction, the first direction being away from the front end; and,
a thrust adjustment device positioned on the front end and arranged to receive a portion of the gas, the thrust adjustment device configured to change a direction of flow of at least a portion of the gas through an end wall of the front end, the end wall being positioned on an opposite side of the chamber from the nozzles.

2. A rocket motor comprising:
a propellant, the propellant configured to generate gas during operation;
one or more nozzles arranged to receive and direct the gas in a first direction;
a thrust adjustment device arranged to receive a portion of the gas, the thrust adjustment device configured to change a direction of flow of at least a portion of the gas, the thrust adjustment device having one or more second openings arranged on an opposite side of a chamber from the one or more nozzles, and a valve member coupled to selectively move between a first position and a second position within the one or more second openings, the valve member having a third opening having an open end arranged to define a first fluid path for the portion of gas when in an open position and prevent flow of the portion of gas to the open end when in a closed position.

3. The rocket motor of claim 2 wherein:
the chamber is arranged to receive the gas, the chamber having a second conical surface opposite a main cylinder, the third opening being disposed within the second surface, the second conical surface including a pair of slots arranged on opposing sides of the third opening; and,
the first fluid path extends through the pair of slots when in the first position.

4. The rocket motor of claim 3 further comprising:
a third surface disposed opposite the second conical surface, the third surface having a first recess and a second recess; and
said valve member includes a selector operably coupled to the third opening adjacent the open end, the selector having an end sized to fit within the first recess and the second recess.

5. A rocket motor comprising:
a propellant, the propellant configured to generate gas during operation;
one or more nozzles arranged to receive and direct the gas in a first direction;
a thrust adjustment device arranged to receive a portion of the gas, the thrust adjustment device configured to change a direction of flow of at least a portion of the gas, the thrust adjustment device having one or more second openings arranged on an opposite side of a chamber from the one or more nozzles, and an interchangeable valve member removably coupled to the one or more second openings; the interchangeable valve member having a third fixed opening having an open end arranged to define a first fluid path for the portion of gas, the chamber being positioned in a front end of the rocket motor.

6. A rocket motor comprising:
a housing having a front end and an opposing end, the front end being in a direction of travel;
a propellant arranged in the housing, the propellant configured to generate and flow a gas toward the front end during operation;
one or more nozzles arranged in the housing and arranged to receive and direct the gas in a first direction, the one or more nozzles being positioned closer to the front end than the opposing end, the first direction being away from the front end; and, a thrust adjustment device coupled to the front end and arranged to receive a portion of the gas and flow the portion of the gas through an end wall of the front end in a second direction, the second direction being opposite the first direction, the thrust adjustment device configured to change a pressure of the gas within the housing during operation.

7. The rocket motor of claim 6 wherein the thrust adjustment device is movable between a first position and a second position, wherein the pressure is reduced when the thrust adjustment device is moved from the first position to the second position.

8. The rocket motor of claim 7 wherein the thrust adjustment device directs a first portion of the gas in the second direction when in the second position.

9. The rocket motor of claim 8 wherein the first portion of the gas is directed from a position coaxial with the housing.

10. A method of operating a rocket motor having a propellant comprising:

providing a housing having a front end and an opposing end, the housing containing the propellant, the front end having a planar end wall;

moving a user selectable thrust adjustment device to a first position, the user selectable thrust adjustment device being positioned on the front end;

igniting the propellant;

generating a gas with the propellant;

directing a first portion of the gas in a first direction through a center of the planar end wall with the user selectable thrust adjustment device; and directing a second portion of the gas through nozzles in a second direction away from the front end.

11. The method of claim 10 wherein the first direction is opposite a direction of travel.

12. A method of operating a rocket motor having a propellant comprising:

moving a user selectable thrust adjustment device to a first position;

igniting the propellant;

generating a gas with the propellant;

directing a first portion of the gas in a first direction with the user selectable thrust adjustment device;

moving a first opening into fluid communication with a chamber containing the gas when in the first position;

moving the user selectable thrust adjustment device to a second position;

moving a second opening into fluid communication with the chamber when in the second position, the second opening being smaller than the first opening;

moving the user selectable thrust adjustment device to a third position; and, stopping the flow of the first portion of the gas when in the third position.

* * * * *